(12) United States Patent
Aasheim et al.

(10) Patent No.: US 11,814,951 B2
(45) Date of Patent: Nov. 14, 2023

(54) INFLOW CHANNEL FOR DETERMINING PROPERTIES OF FLUID FLOWING THERETHROUGH

(71) Applicant: STATOIL PETROLEUM AS, Stavanger (NO)

(72) Inventors: Robert Aasheim, Porsgrunn (NO); Dominik Andreas Breu, Appenzell (CH); Frank Møller Nielsen, Trondheim (NO); Bjarne Bugten, Hundhamaren (NO); Kjetil Johannessen, Ranheim (NO); Einar Skavland Idsø, Trondheim (NO); Lisbeth Vold, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 144 days.

(21) Appl. No.: 15/756,451

(22) PCT Filed: May 10, 2016

(86) PCT No.: PCT/NO2016/050085
§ 371 (c)(1),
(2) Date: Feb. 28, 2018

(87) PCT Pub. No.: WO2017/003297
PCT Pub. Date: Jan. 5, 2017

(65) Prior Publication Data
US 2018/0245453 A1 Aug. 30, 2018

(30) Foreign Application Priority Data

May 10, 2016 (WO) ................ PCT/NO2016/050085

(51) Int. Cl.
*E21B 47/07* (2012.01)
*G01F 1/68* (2006.01)
(Continued)

(52) U.S. Cl.
CPC .............. *E21B 47/07* (2020.05); *E21B 36/04* (2013.01); *E21B 43/08* (2013.01); *E21B 47/10* (2013.01);
(Continued)

(58) Field of Classification Search
CPC ........ E21B 47/065; E21B 36/04; E21B 43/08; G01F 1/68
See application file for complete search history.

(56) References Cited

U.S. PATENT DOCUMENTS 4,418,568 A * 12/1983 Surman .................. G01F 1/684
73/114.33
6,227,045 B1 * 5/2001 Morse ...................... G01P 5/12
73/204.22
(Continued)

FOREIGN PATENT DOCUMENTS

CN 101421486 A 4/2009
EP 0 588 421 A1 3/1994
(Continued)

OTHER PUBLICATIONS

International Search Report, issued in PCT/NO2015/050150, dated Mar. 23, 2016.
(Continued)

*Primary Examiner* — Tara Schimpf
*Assistant Examiner* — Theodore N Yao
(74) *Attorney, Agent, or Firm* — Birch, Stewart, Kolasch & Birch, LLP

(57) ABSTRACT

An apparatus for determining properties of fluid flowing into a well includes an inflow channel providing a path for fluid to a pipe, a heater arranged to heat at least part of the fluid in the inflow channel, and a temperature sensor arranged to measure the temperature of the fluid in the inflow channel.

6 Claims, 9 Drawing Sheets

(51) Int. Cl.
*E21B 43/08* (2006.01)
*E21B 36/04* (2006.01)
*E21B 47/10* (2012.01)
*G01F 1/7084* (2022.01)
*E21B 47/113* (2012.01)

(52) U.S. Cl.
CPC .............. *E21B 47/113* (2020.05); *G01F 1/68* (2013.01); *G01F 1/7084* (2013.01)

(56) References Cited

U.S. PATENT DOCUMENTS

| | | | | |
|---|---|---|---|---|
| 6,497,279 | B1* | 12/2002 | Williams | E21B 47/07 73/152.33 |
| 6,817,410 | B2* | 11/2004 | Wetzel | E21B 43/084 166/236 |
| 2002/0053439 | A1 | 5/2002 | Danos | |
| 2004/0108107 | A1 | 6/2004 | Wittrisch | |
| 2004/0252748 | A1* | 12/2004 | Gleitman | E21B 47/135 374/130 |
| 2006/0010973 | A1* | 1/2006 | Brown | E21B 47/1005 73/204.11 |
| 2006/0214098 | A1* | 9/2006 | Ramos | E21B 47/09 250/256 |
| 2007/0158064 | A1* | 7/2007 | Pribnow | G01F 1/6884 166/250.01 |
| 2007/0246407 | A1 | 10/2007 | Richards et al. | |
| 2008/0185138 | A1* | 8/2008 | Hernandez-Solis | E21B 36/04 166/60 |
| 2009/0008092 | A1* | 1/2009 | Haeberle | E21B 33/12 166/278 |
| 2010/0089141 | A1* | 4/2010 | Rioufol | G01F 15/00 73/152.28 |
| 2011/0153225 | A1* | 6/2011 | Mangal | G01F 1/00 702/24 |
| 2013/0341008 | A1* | 12/2013 | Brady | E21B 47/1005 166/250.01 |
| 2017/0122477 | A1* | 5/2017 | Viellard | F16L 59/163 |

FOREIGN PATENT DOCUMENTS

| | | |
|---|---|---|
| EP | 1 407 806 A1 | 4/2004 |
| WO | WO 2005/064117 A1 | 7/2005 |
| WO | WO 2007/126496 A2 | 11/2007 |
| WO | WO 2008/053364 A2 | 5/2008 |
| WO | WO 2015/122915 A1 | 8/2015 |

OTHER PUBLICATIONS

International Search Report, issued in PCT/NO2016/050085, dated Nov. 22, 2016.
Written Opinion of the International Searching Authority, issued in PCT/NO2015/050150, dated Mar. 23, 2016.
Written Opinion of the International Searching Authority, issued in PCT/NO2016/050085, dated Nov. 22, 2016.

* cited by examiner

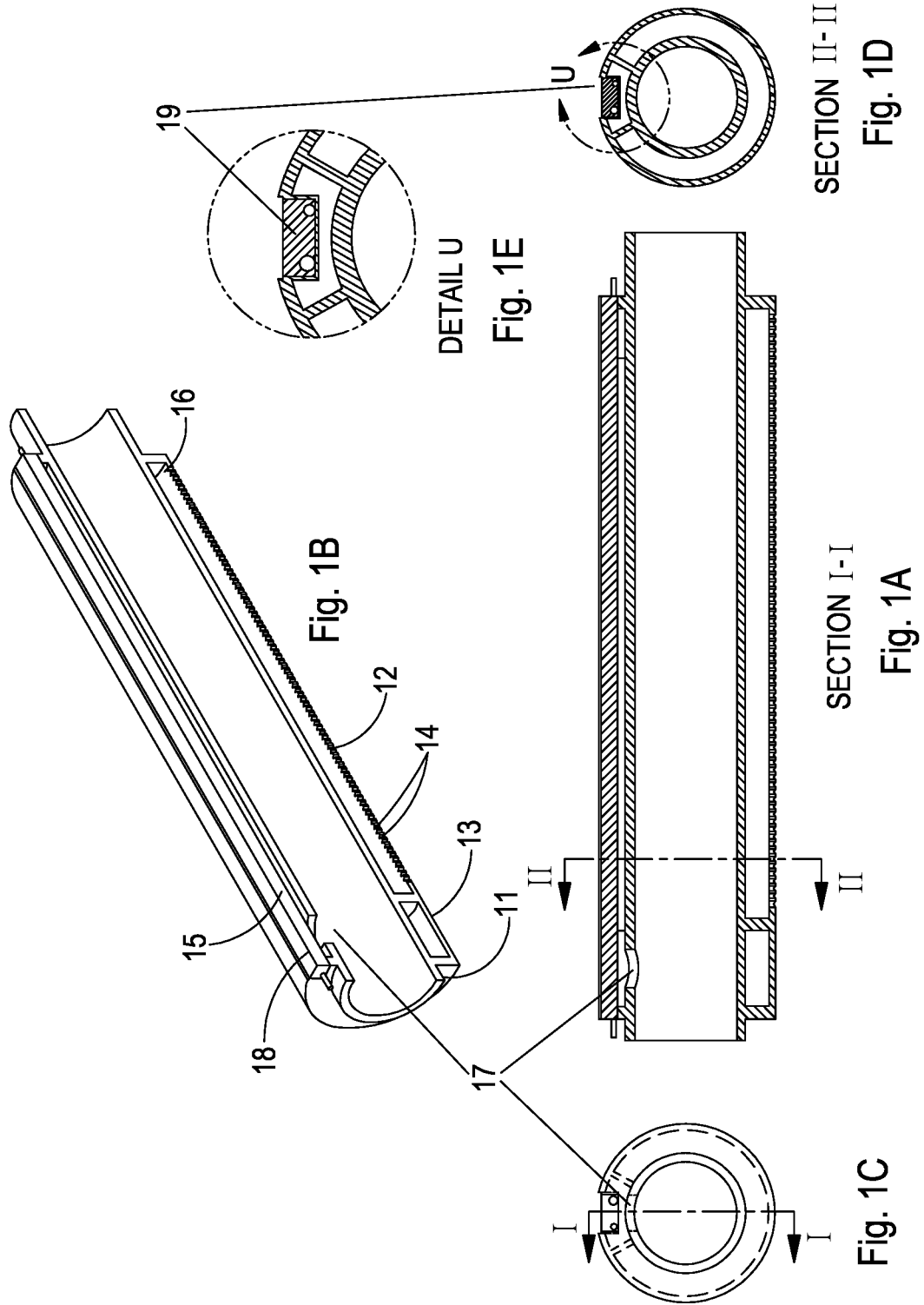

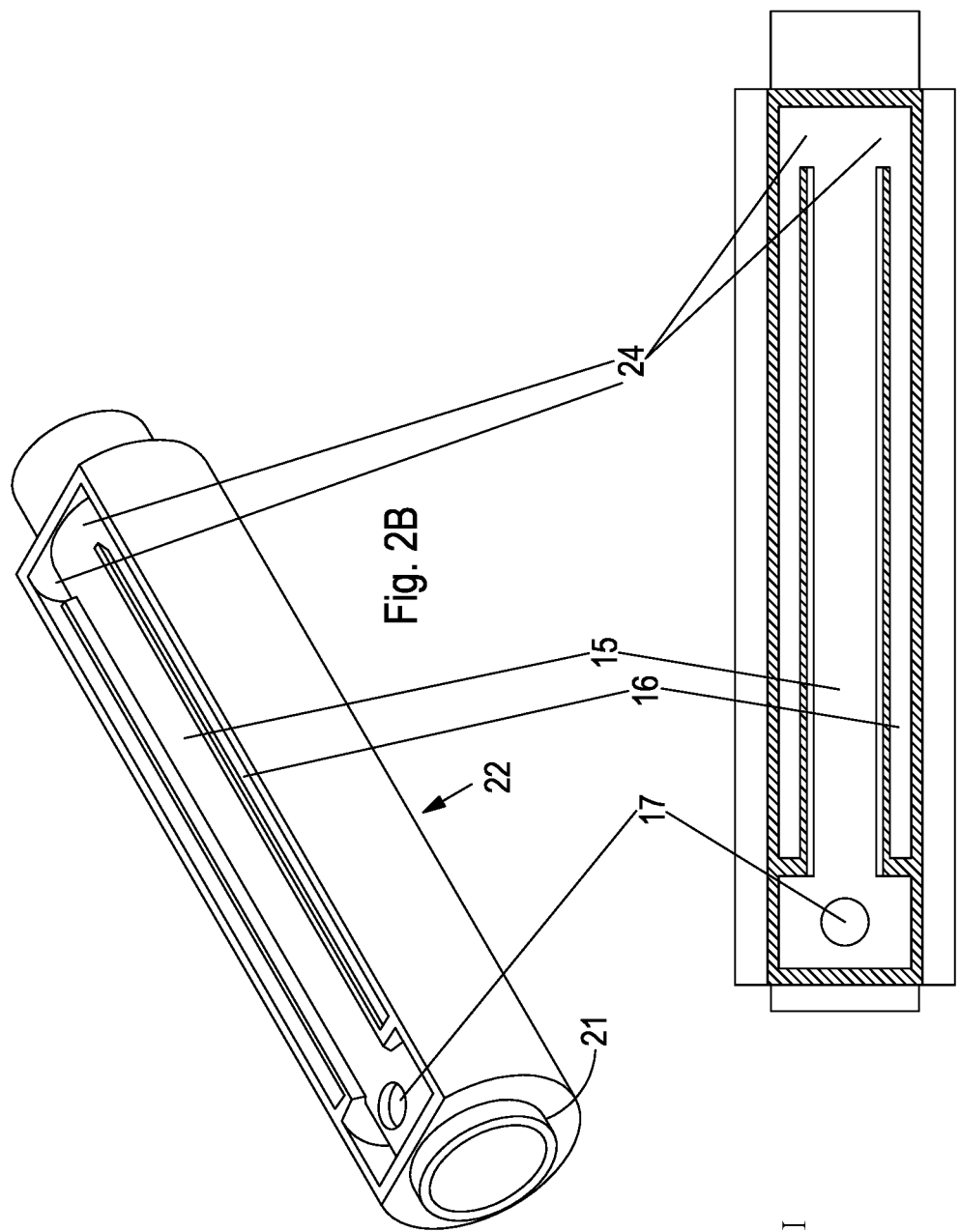
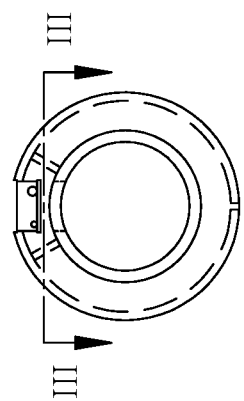

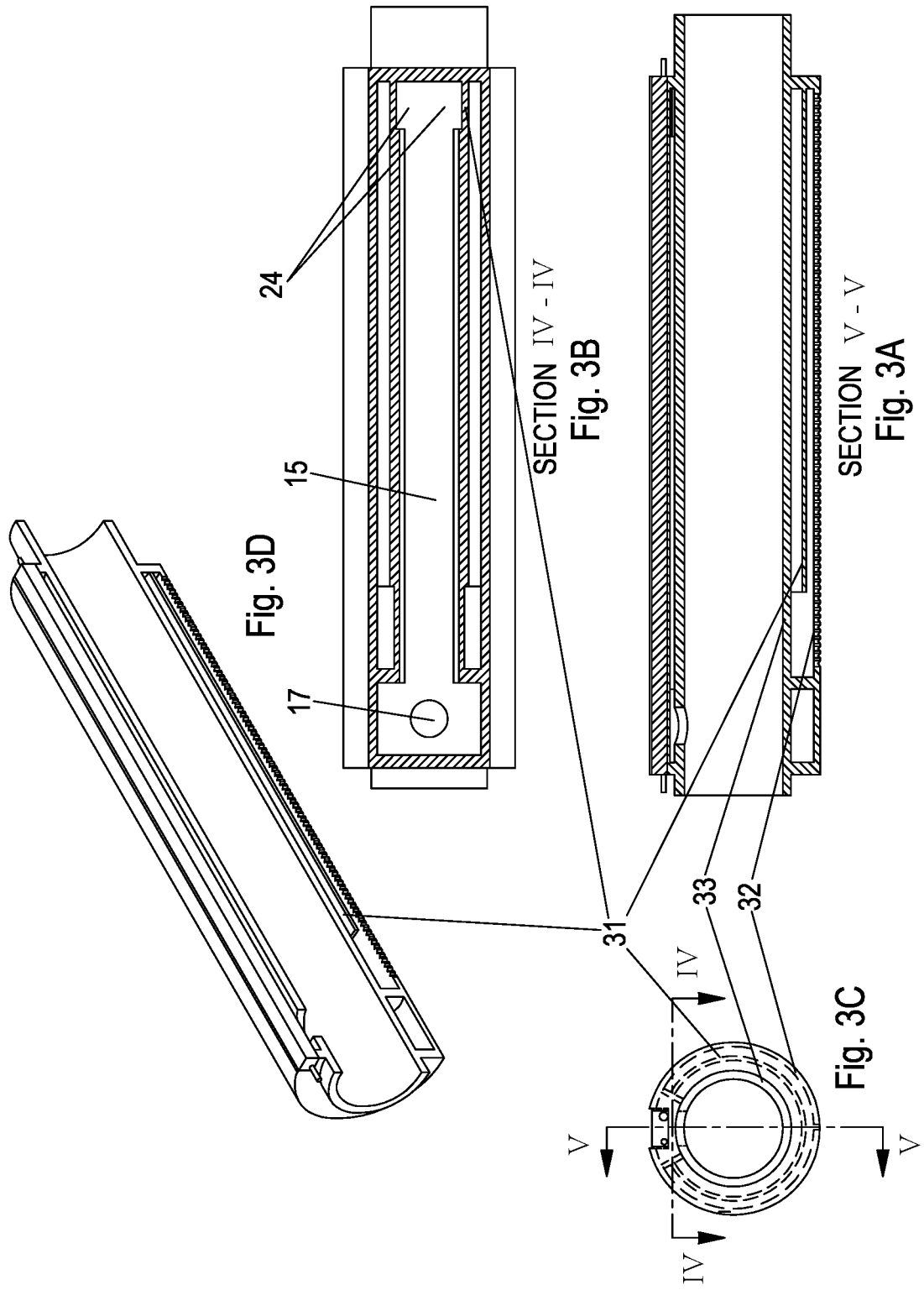

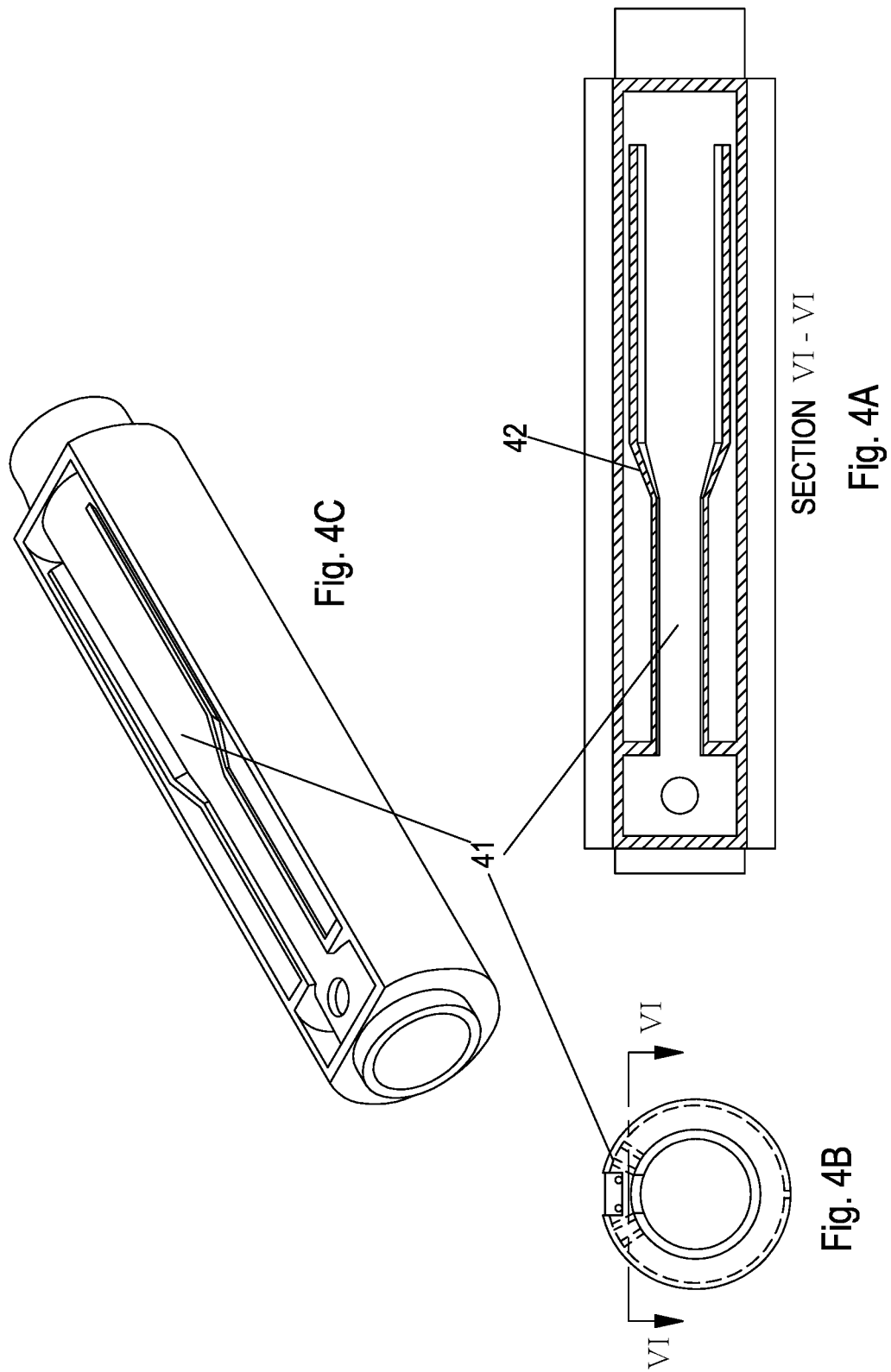

INFLOW CHANNEL FOR DETERMINING PROPERTIES OF FLUID FLOWING THERETHROUGH

FIELD OF THE INVENTION

The present invention relates to an inflow channel in a well, a method of determining a fluid inflow rate and a method of controlling a fluid inflow rate.

BACKGROUND

A production pipe provides a conduit for transporting fluids and gas from a well towards the surface. A sand screen is arranged outside the production pipe to block sand and provide an entrance for fluids such as hydrocarbons and gas from a formation into the production pipe and the fluids and gas can then be transported through the production pipe towards the surface.

STATEMENT OF INVENTION

According to a first aspect of the invention, there is provided an apparatus for determining properties of fluid flowing into a well, the apparatus comprising: an inflow channel providing a path for fluid to a pipe, a heater arranged to heat at least part of the fluid in the inflow channel, a temperature sensor arranged to measure the temperature of the fluid in the inflow channel.

The heater may be arranged to heat one or more sections of fluid in the inflow channel for a predetermined time period. The heater may also be arranged to heat one or more sections of fluid, wherein the one or more sections are arranged along a longitudinal direction parallel to the flow direction within the inflow channel. The heater may be an electric heating cable arranged parallel to the longitudinal direction of the inflow channel.

The temperature sensor may be arranged to measure the temperature at a plurality of locations in a direction parallel to the longitudinal direction of the inflow channel, and may also comprise one or more fibre optic cables arranged parallel to the longitudinal direction of the inflow channel.

In particular, the temperature sensor may comprise two or more fibre optic cables arranged parallel to the inflow channel. The heater and the temperature sensor may be embedded within a medium. The medium may be arranged adjacent to the fluid flow such that a thermal boundary layer is created at the interface between the medium and the fluid when the heater is switched on during use.

An abrupt change in shape of the interface may be provided between the medium and the fluid. The channel may comprise a tapered section for restricting the diameter of the inflow channel.

According to a second aspect of the invention, there is provided a method of estimating properties of a well fluid flowing through an inflow channel towards a pipe, the method comprising heating a portion of the fluid within the inflow channel, measuring the temperature of the fluid within the inflow channel.

The step of heating may be carried out at a plurality of locations along the inflow channel for a predetermined time period. The step of measuring may be carried out at a plurality of locations along the inflow channel for a predetermined time period. Both the heating and the measuring step may be carried out with a predetermined spatial or temporal resolution. The method may further comprise determining one or more of: viscosity, flow speed, heat capacity and phase ratio.

According to a third aspect of the invention, there is provided an inflow assembly providing a fluid path into a pipe, the assembly comprising a pipe having a longitudinal direction, a sand screen arranged outside the pipe along said longitudinal direction, an annulus between the pipe and the sand screen, a fluid conduit arranged within the annulus in said longitudinal direction; wherein the fluid conduit provides a fluid path from the annulus towards an opening in the pipe.

The inflow channel may be formed by walls which extend from the pipe to a housing pipe, wherein the housing pipe comprises the sand screen. The fluid conduit may be provided outside the pipe; the fluid conduit may comprise at least one opening to the sand screen and the assembly may further comprise an inflow point in the wall of the pipe, wherein the inflow point of the pipe is provided in the vicinity of an outlet of the fluid conduit. At least part of said fluid conduit may be tapered.

The assembly may further comprise a heating cable provided adjacent said fluid conduit and/or a fiber-optic sensor provided adjacent said fluid conduit. The fiber-optic sensor can be arranged to determine the temperature profile along at least part of the length of said conduit.

An inflow control device may further be provided. For example, means for providing friction within the fluid conduit or a restriction of the fluid conduit. Alternatively, the cross sectional area of the fluid conduit may vary along the longitudinal direction of the fluid conduit.

The pipe may be a production pipe. The sand screen may be arranged to block sand and provide an opening for fluid and gas. The fluid conduit may be an inflow channel and may be the only fluid path from the sand screen to the opening in the pipe.

According to a fourth aspect of the invention, there is provided a method of determining an inflow rate of fluid into a pipe, the method comprising: providing a fluid conduit outside the pipe between a sand screen and an inflow point in the pipe; providing a heater cable and a fibre optic cable adjacent to the fluid conduit; heating the heater cable and measuring a property of fluid flowing through the fluid conduit with the fibre optic cable; calculating the inflow rate of the fluid based on the measured property.

According to a fifth aspect of the invention, there is provided a method of controlling a fluid inflow rate of fluid into a pipe, the method comprising: providing a fluid conduit outside the pipe between a sand screen and an inflow point in the pipe; providing fluid inflow rate control means within said fluid conduit. The inflow rate control means may comprise one or more of: a varying cross section of the fluid conduit, an obstruction within said fluid conduit or means for providing an electric current.

FIGURES

Some embodiments of the invention will now be described by way of example only and with reference to the accompanying drawings, in which:

FIG. 1A is a vertical cross section of an inflow assembly;
FIG. 1B is a perspective view of an opened-up inflow assembly;
FIG. 1C is a vertical cross section of an inflow assembly;
FIG. 1D is a vertical cross section of an inflow assembly;
FIG. 1E is a detail of the vertical cross section of FIG. 1D;

FIG. 2A is a horizontal cross section of an inflow assembly;

FIG. 2B is a perspective view of an opened-up inflow assembly;

FIG. 2C is a vertical cross section of an inflow assembly;

FIG. 3A is a vertical cross section of an inflow assembly;

FIG. 3B is a horizontal cross section of an inflow assembly;

FIG. 3C is a vertical cross section of an inflow assembly;

FIG. 3D is a perspective view of an opened-up inflow assembly;

FIG. 4A is a horizontal cross section of an inflow assembly;

FIG. 4B is a vertical cross section of an inflow assembly;

FIG. 4C is a perspective view of an opened-up inflow assembly;

SPECIFIC DESCRIPTION

Figure 5:
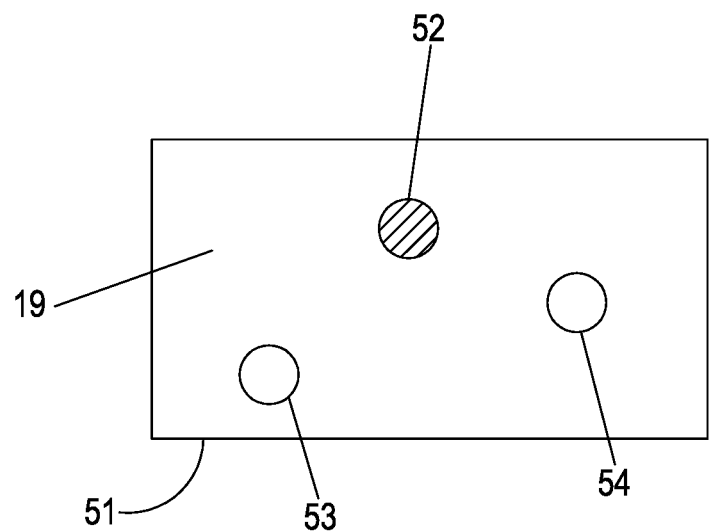
FIG. 5 is a schematic cross section of a conduit.

Herein disclosed is an inflow assembly providing a fluid path from a formation into a pipe. The assembly comprises a pipe, such as a production pipe, with a sand screen arranged outside the pipe along the longitudinal direction of the pipe. The sand screen blocks sand and stones, while letting fluids and gas through. A conduit is arranged along the longitudinal direction of the pipe providing a fluid path from the outside of the pipe to the inside of the pipe. The conduit is a longitudinal channel which increases the length of the fluid path when compared to a direct path of fluids from the sand screen into the production pipe. The conduit can be used for measuring fluid properties and can further be used for controlling the fluid flow into the pipe.

FIGS. 1A to 1E illustrate a first embodiment. A production pipe 11 is illustrated, which has a longitudinal direction. The production pipe is illustrated as a horizontal pipe and the assembly of FIG. 1 can be used in a horizontal well, but use of the pipe is not restricted to a particular orientation of the well. The pipe is surrounded by a sand screen 12, whereby the sand screen surrounds the pipe in radial direction while covering only part of the pipe in longitudinal direction. The sand screen is part of a housing pipe 13 which is arranged coaxially with respect to the production pipe 11. The sand screen includes a plurality of openings 14 which act like a filter by letting through fluids and gas while blocking solid particles. An inflow channel 15 is provided outside the production pipe 11 but within the housing pipe 13 and arranged in the longitudinal direction of the production pipe 11. The inflow channel is formed by walls which extend from the production pipe to the housing pipe. An annulus 16 is provided between the sand screen and production pipe 11. An inflow point 17 is provided in the wall of the production pipe in the vicinity of an end of inflow channel 15. Fluid from the formation flows into annulus 16, then through inflow channel 15 and finally through inflow point 17 into the production pipe. A fibre optic cable and heating cable 18 are provided in the longitudinal direction of the inflow channel and can be used to measure the heat cable temperature or fluid temperature to determine properties of the fluid such as flow and/or composition. The inflow channel 15 can also be used to alter one or several properties of the fluid along the length of the channel. The properties include, but are not restricted to temperature and velocity. The temperature may be altered by the heating cable provided along the inflow channel. The velocity of the fluid can be altered by providing friction or restrictions in the inflow channel by placing obstacles within the channel or by changing the cross sectional area of the channel. A fluid control device such as a valve may be placed in the inflow channel for controlling the fluid flow.

The combined fibre optical cable and heating cable 18 is used to measure the temperature of the heating cable at (evenly) distributed locations. In a horizontal oil well, there normally exists no geothermal gradient along the different inflow regions. Apart from the Joule Thompson effect, the temperature along the horizontal inflow regions is thus constant if the heating cable is switched off. The Joule Thompson effect may cause a temperature change if gas is compressed or expands in the inflow channel. When the heater cable is heated above the temperature of the wellbore, the produced fluid that flows through the inflow channel lowers the temperature as a function of flow rate, liquid properties, and geometry of the channel. From the measured temperature profile at each section, the inflow profile and the fluid properties at each section may be determined. The heater cable and fibre are provided within a conduit 19 as illustrated in FIG. 1D and FIG. 1E. The heater cable and fibre are spatially separate from the fluid flow, but thermally connected by thermally conducting materials separating the heater cable and fibre from the fluid. The conduit 19 may be heated up by the heater cable, while the fluid flow cools the conduit down. Without the presence of the conduit, the heating cable and the fibre could be provided directly within the fluid. If the heating cable and fibre are provided directly within the fluid, however, the fibre may not be able to measure the effect of the heating cable on the fluid because the fluid flow would generally move the heated portion of the fluid away before that portion can reach the adjacent section of the fibre.

Conduit 19 may be made of a solid material such as metal which encases the heater cable and the fibre. At the interface between conduit 19 and the fluid within the inflow channel, a thermal boundary layer will be present and measurements carried out on this boundary layer will reveal properties of the fluid flowing through the channel.

The use of a long inflow channel 15 enables a longer spatial measurement distance and therefore an increased accuracy of the temperature measurement compared to a set-up without an inflow channel. In the setup with the heating cable, the long inflow channel gives a long contact length between the heating cable and the fluid, which allows an improved heat transfer from the heating cable to the fluid. The long inflow channel also enables multiple, spatially separate measurements per section, which enables calculation of fluid composition.

FIGS. 2A, B and C also show the embodiment of FIG. 1. FIGS. 1C and 2C illustrate both the same vertical cross section in the direction perpendicular to the longitudinal axis of the production pipe 11. FIG. 2B is a perspective view of the embodiment, showing production pipe 21 and sand screen 22 whereby the top is cut open along section III-III shown in FIGS. 2C and 2A. Inflow point 17 and inflow channel 15 are illustrated. Inflow channel 15 has openings 24 to annulus 16 at the end of the inflow channel opposite to the end of the inflow channel closest to inflow point 17. The fluids and gas which enter the annulus through the sand screen can only reach inflow point 17 via inflow channel 15.

FIGS. 3A to 3D illustrate a second embodiment. FIG. 3A is a vertical cross section along plane V-V in FIG. 3C, while FIG. 3B is a horizontal cross section along plane IV-IV in FIG. 3C. The features of the second embodiment are the same as those of the first embodiment, except for the presence of a conduit pipe 31 which is arranged between sand screen 32 and production pipe 33. Conduit pipe 31 does not extend into inflow channel 15, but extends from one side wall of the inflow channel to the other side wall of the inflow channel as illustrated in FIG. 3C, thereby dividing the space between the sand screen and the production pipe in two sections. The two sections are open to each other on the side of the conduit pipe opposite to openings 24 of the inflow channel. Conduit pipe 31 increases the length of the fluid path from the sand screen to inflow point 17 when compared to the embodiment of FIG. 1 which does not include conduit pipe 31. The additional length of the fluid path can be used for further measurements and/or control of the fluid. For example, an additional fibre or an additional heating cable could be used in the space adjacent to conduit pipe 31, but these options are not illustrated in FIG. 3. As an additional example, obstructions could be placed adjacent to conduit pipe 31 for slowing down the flow velocity.

FIG. 4 illustrates a third embodiment. FIG. 4A is a horizontal cross section along plane VI-VI shown in FIG. 4B. The features of the third embodiment are the same as those of the first embodiment, except for the shape of inflow channel 41 which has a different shape when compared to inflow channel 15 of the first embodiment. The end of inflow channel 41 which forms an entrance for fluids has a larger diameter than the other end of inflow channel 41 and a tapered section 42 connects the part with the smaller diameter with the part with the larger diameter. The restricted diameter will alter the velocity of the fluid. Other means to alter fluid properties may be provided, such as a heating cable, means for generating additional friction, using obstacles or using an electric current. A fibre optic cable may be used to measure temperature.

The arrangement of the heater cable and heat sensor can be used to measure properties of the fluid such as inflow rate and composition of the fluid. The number of unknown parameters may only be one, when only the inflow rate, heat capacity or viscosity of the fluid is unknown, but could also be more such as when the inflow rate and the ratio of two phases are both unknown, or when the inflow and presence of three phases are unknown, or there may be other combinations of unknown parameters. This number of unknown parameters needs to be matched by a suitable number of measurements in order to solve the problem at hand and estimate the unknown parameters.

One example of a measurement which is important in a well control system is the detection of a sudden inflow of water which (partially) replaces the inflow of hydrocarbons. An assembly of multiple inflow channels with associated diagnostic tools can be used to estimate properties of the entire well system, including inflow from a different geothermal origin at different points of inflow or whether the fluid is flowing up or down in the near well region of the sensor, the effects of injection of fluids, the effect of artificial lift, the thermal history and Joule Thompson effects. The inflow channel enables local measurements which provide information about an individual well section, with dimensions similar to those of the screen. Measurements from multiple inflow channels can be combined to gain information about the complete well, which may be several kilometres in length. The knowledge of individual sections can be used to optimise performance of the well system. Measurements on the inflow channel also provide a way to monitor the state of the screen, which sometimes collapses in a well under large pressure.

The inventors have appreciated that the inflow channel with the heater cable and fibre can be used in various ways to estimate the unknown parameters. Some examples will be given below. The different examples can be combined to further increase the number of independent measurements. Even when a single variable is measured, such as the viscosity of a fluid, multiple independent measurements may be used to increase the accuracy of the measurement of that particular variable.

A first example of increasing the number of measurements is providing one heater cable within the conduit 19 together with two fibres. The heater cable and the two fibres are all arranged parallel to the longitudinal direction of the inflow channel. The distance in the transverse direction between the fluid-conduit interface and the first fibre is different when compared to the distance between the same interface and the second fibre. The different distances between the interface and the fibres enable the determination of a temperature gradient within the material of the conduit. A higher flow rate of a fluid within the inflow channel will result in a larger temperature gradient because the higher flow rate will cool the material of the conduit more quickly. The fibre provided closer to the fluid-conduit interface will register a lower temperature than the fibre provided further away from the fluid-conduit interface. FIG. 5 illustrates a cross section of conduit 19 with interface 51. Heating cable 52 is provided and a first fibre 53 which is located closer to interface 51 than a second fibre 54. The two fibres may be arranged between the surface and the heat source.

Alternatively, the temperature sensor such as a fibre could be placed within the fluid in close proximity to the surface, such that the temperature of the boundary layer can be determined directly.

A second example of increasing the number of measurements is switching the heater cable on or off while recording the temperature with one or more fibres. A faster inflow of fluid or a fluid with a high heat capacity will cool the conduit down more quickly than a fluid with a slow inflow or a low heat capacity. The temperature may also be varied continuously or stepwise between higher and lower heating temperatures without switching the heater cable off completely.

Figure 6:
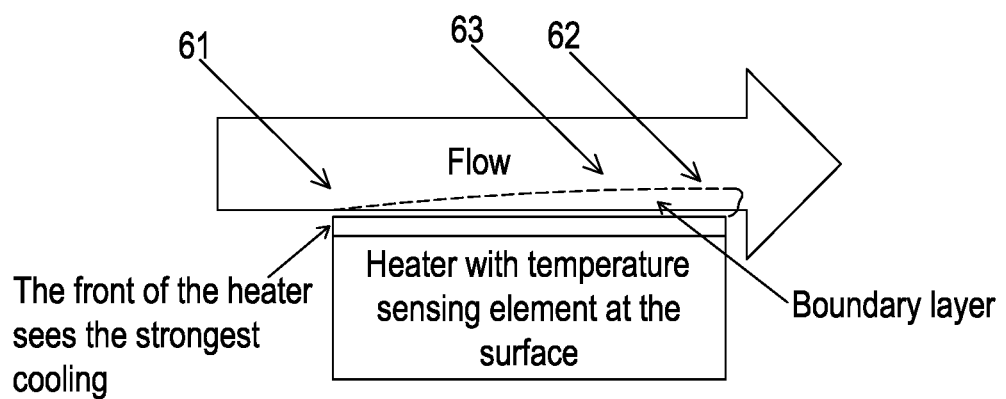
FIG. 6 illustrates a thermal boundary layer.

A third example is taking multiple measurements distributed along the longitudinal direction of the inflow channel, combined with a constant longitudinal heating source. FIG. 6 illustrates the interface with a longitudinal temperature profile. Depending on the flow speed, The front region of the heater 61, which is the 'upstream' portion of the heater, will be adjacent to a boundary layer of fluid which has not yet heated up at all, while a 'downstream' portion 62 will have a higher temperature. If the fluid flows quickly, the downstream portion 62 will have a lower temperature when compared to the same portion for a slow fluid flow. The dotted line 63 indicates the transient where the flow meets the thermal perturbation. The front region 61 is where the thermal boundary layer is established and this region is sensitive to flow parameters, such as flow speed.

Optionally, the inflow channel is arranged in such a way that the inflow abruptly meets the surface with controlled temperature with minimal other perturbation to the flow in that area. The abrupt change may be a physically stepped surface, a change discontinuity in the temperature source, a discontinuity in the heat conduction (e.g. a transition from an insulator to a heat conductor) or it may be provided in switching on or off the thermal effect in an abrupt manner (on the time scale of the movement of the fluid in the flow channel).

The downstream portion 62 has thermal properties which are dominated by a heat flux through an established and relatively uniform boundary layer to a constantly renewed flow of the funneled inflow fluid. This region is typically dominated by the thermal properties of the fluid. Measurements will generally provide a number for the thermal exchange per length unit of the flow channel. This parameter will be dependent on the flow velocity, thermal parameters and fluid dynamic parameters of the fluid.

A combination of measurements in the two regions 61 and 62 may be used to derive properties of the fluid such as viscosity or the Reynolds number, or may be used to accurately determine the fluid flow velocity.

The measurements can be extended by using additional types of measurements such as acoustic measurements, or pressure measurements using a Venturi device.

A fourth example is heating the conduit in a discrete section, while measuring the temperature along a longitudinal distance extending further than this discrete section.

Figure 7:
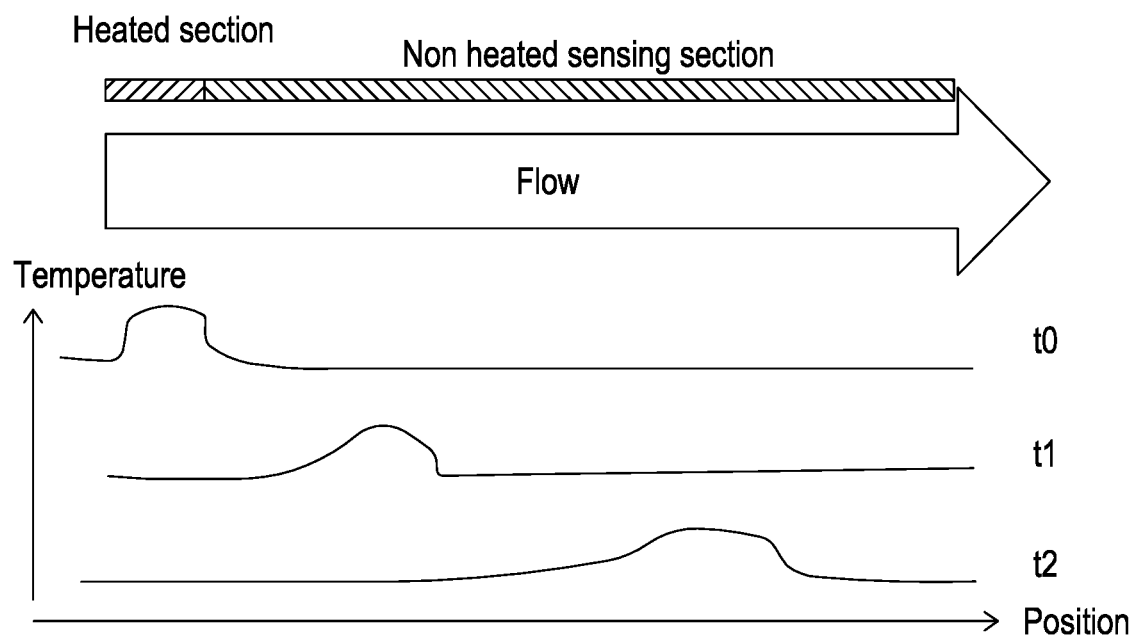
FIG. 7 illustrates the propagation of a heat pulse.

The second, third and fourth examples may be combined into a fifth example, by creating a heat pulse in a discrete section of the inflow channel and measuring the propagation of the heat pulse in the longitudinal direction. FIG. 7 illustrates the effect of a heat pulse on the temperature of a fluid which flows through a flow channel. The portion of the heated fluid, and thereby the portion of heated conduit, will move in the direction of the flow and will also dissipate over time. By analysing the propagation of the heat pulse and the time dependent shape of the heat pulse, the inflow rate and/or ratio of the phases can be estimated.

The distributed measurements described above in principle allow for further diagnostics by analysing the broadening of the heat pulse depending on turbulence and thermal diffusivity of the fluid.

An example of a method for creating the heat pulse is direct electrical switching of the heater.

The measurement process may be repeated or carried out for a longer time period in order to reduce noise.

The shape of the inflow channel can also be used to control the fluid dynamics and extract more information about the fluid. FIG. 4 illustrates a tapered section 42 which will reduce the diameter of the inflow channel, possibly leading to an increase of flow speed, an increase of pressure and/or an increase of temperature if a gas phase is present. An obstruction may be provided within the inflow channel with the purpose of causing turbulent flow and mixing different components within the fluid.

The inflow channel may be coupled to a well-controlled injection location on the base pipe of the well in the case of a producer. This may be just the end of the channel itself as a T-junction with the base-pipe, through an inflow control valve (ICV) or an inflow control device (ICD). It may also form a junction in the well. The junction may be a typical branch where the contribution from the branch is comparable to the basepipe and down to a microchannel (e.g. Fishbone technology), but typically it includes all the flow going through one screen joint or between two zonal isolation packers along the basepipe.

Figure 8:
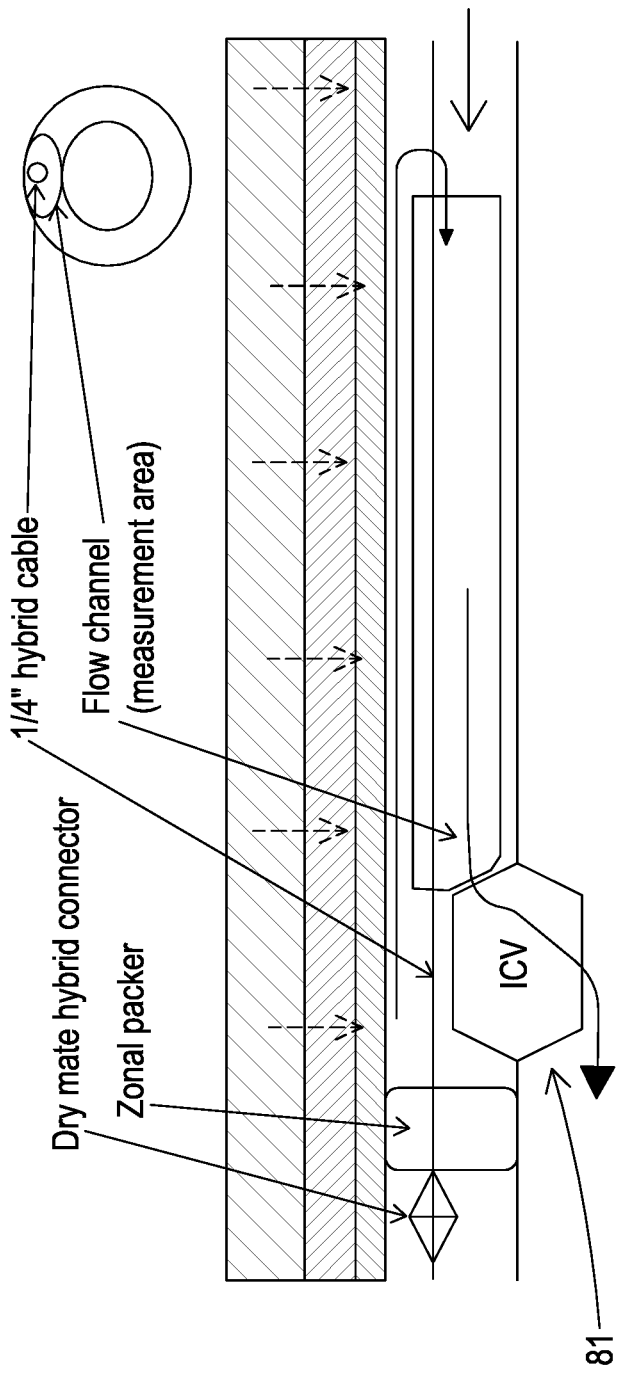
FIG. 8 illustrates an inflow channel with an inflow control valve.

Alternatively the flow channel may be coupled with either side of an ICV so that all the flow that goes through the ICV is also guided through the flow channel. FIG. 8 illustrates an ICV 81 which is arranged at an outlet of an inflow channel 82. The ICV can also be used for controlling the measurement process. For example, the ICV can be closed to stop the fluid flow within the flow channel completely, providing an opportunity to only 'switch off' one of the unknown parameters, in particular the flowrate, and more accurately measure the other parameters. The measurements carried out on the inflow channel can also be used as inputs for the ICV. For example, the ICV can be closed in response to a measurement of a sudden inflow of water.

A perturbation of the temperature source can be synchronized with the distributed temperature monitor, which is typically a fibre optic distributed temperature sensor. The sensor may not only average over space, but bin and average over a space and time where the time axis is synchronized with the perturbation of the heat source, e.g. so that a sample is made for every 1524 m and 11 seconds after turning on the temperature source. This will allow for the effect of the heating to be distinguished from the background temperature effect as the temperature effect is detected as a perturbation on the background (much the same way as a lock-in amplifier operates).

In the case of an electrically induced temperature perturbation, the electrical cable itself can provide both the power for heating the flow channel and the power for controlling local devices within the well. The electrical power is transferred from the wellhead to the production zone where it will be used for multiple purposes. The power may be a high voltage power, for example 1 or 2 kV, to minimize the losses along the way. The high voltage power will then have to be transformed back to a lower voltage suitable for the equipment in the production zone. The transformation takes place with a transformer. After the transformer, a circuit is provided wherein one of the wires is the ground in the circuit by a conductive connection to the formation. The power can then be distributed by using one further wire, thereby simplifying the connectors to one pin. The electrical power can be picked up by electrical equipment already used in the well, based on components such as a current transformer or non-galvanic contacts.

Figure 9:
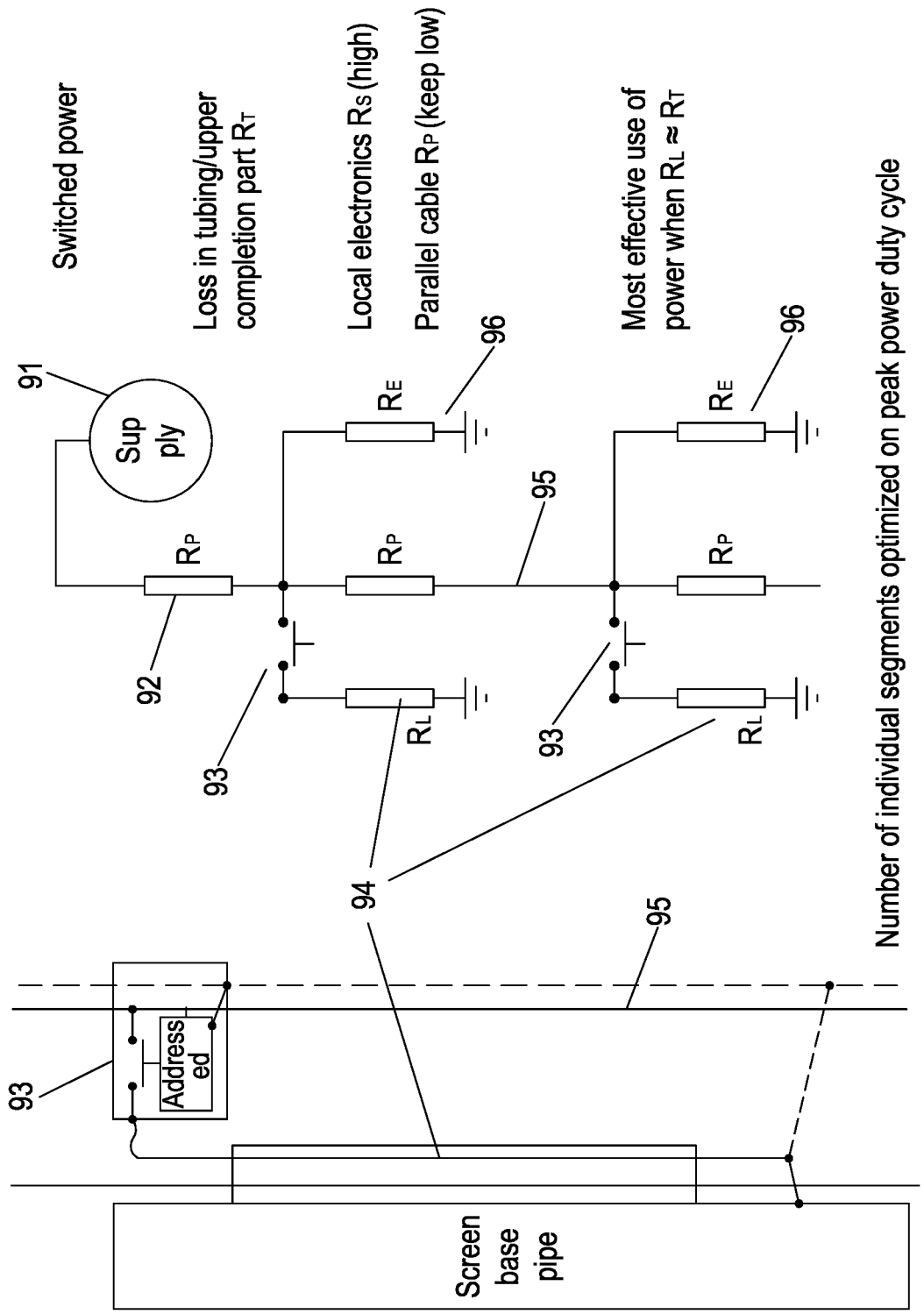
FIG. 9 illustrates an electric circuit used for a heating cable.

FIG. 9 illustrates a circuit for controlling electrical heating elements based on switches. A power supply 91 is arranged to supply power to a cable 92 which has a resistance RT, and the cable can include a transformer if the power supply is arranged to supply a high voltage to the cable. The cable is connected via a switch 93 to the heating cable 94. The heating cable has a resistance RL. The cable 95 in the production zone has a resistance Rp. Further electronic components 96 with resistance RE can be provided in the production area which use the power provided by cable 95.

An electric current may also be passed directly through the fluid to heat the fluid, particularly for a water continuous phase. A bimetallic action of a bimetallic element actuated by a switched electric signal can be used for mechanically switching a thermally controlled surface in or out of the fluid flow. Alternatively, part of the fluid may be heated in a separate chamber and then be injected into the flow by opening the chamber to the inflow channel, for example by port which is controlled by a bimetallic mechanism.

The power transfer may be at high voltage, which is locally converted to lower voltage. The thermal source may be a part of a Peltier element. The thermal source may be a tube carrying fluid of a controlled temperature. The thermal source may be a tube in which a controlled chemical reaction (exothermic or endotherm) is occurring. The thermal source may be some form of thermal conductor providing controlled conduction of heat from one part of the well to another. The element can take the form of a rib of highly thermally conducting material sandwiched with an insulator e.g. carrying heat from a warm basepipe to a section of an otherwise thermally insulated inflow channel. An electrical heater arrangement may utilize a voltage transformer to provide a high voltage with low energy loss where heat is not needed, typically in the tubing section above the production packer. The transformer solution may also be used to ground the well at any chosen location and allow for having e.g. the liner itself provide the return path for the heater power.

The inflow channel opens furthermore for the possibility to alter some fluid properties (such as fluid velocity) by incorporating obstructions and/or geometry changes. The additional information from the temperature profile caused by this enables the extraction of further fluid parameters.

A further refinement of the sensor described herein is if the thermal change is introduced on a time scale that is short compared to the spatial resolution divided by the flow velocity. Then the flow velocity can be determined directly as in an anemometer. Either a spatial section can be applied so that thermal change is kept a localized effect and there is a longer section downstream where the effect can be observed. Alternatively the effect can be observed over a uniform thermal strip by means of deconvolving the local thermal response and the flow velocity.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. An apparatus for determining properties of a fluid flowing into an inner pipe in a well, the apparatus comprising:
   an inflow channel arranged along an outside of the inner pipe and within an outer pipe that is arranged radially outward of the inner pipe, and having a first opening in fluid connection with an outside of the inner pipe and a second, radial opening in fluid connection with an inside of the inner pipe so that said inflow channel provides a path between the first opening and the second opening from the outside of the inner pipe to the inside of the inner pipe, wherein the inflow channel is configured to allow the fluid to flow from the outside of the inner pipe through the first opening and to the second opening, and then through the second opening to the inside of the inner pipe,
   a heater arranged to heat at least part of the fluid in the inflow channel,
   a temperature sensor arranged to measure a temperature of the fluid in the inflow channel,
   wherein the heater is an electric heating cable having a longitudinal axis along a length of the cable, and the longitudinal axis is arranged parallel to a longitudinal direction of the inflow channel,
   wherein the electric heating cable and the temperature sensor are both embedded within a metallic medium, and
   wherein said metallic medium resides in a recess in a wall of said outer pipe, and said wall is arranged to prevent outflow from the inflow channel in radial directions.

2. The apparatus according to claim 1, wherein the heater is arranged to heat one or more sections of fluid in the inflow channel for a predetermined time period.

3. The apparatus according claim 1, wherein the temperature sensor is arranged to measure the temperature at a plurality of locations in a direction parallel to the longitudinal direction of the inflow channel.

4. The apparatus according to claim 1, wherein the temperature sensor comprises one or more fibre optic cables arranged parallel to the longitudinal direction of the inflow channel.

5. The apparatus according to claim 1, wherein the temperature sensor comprises two or more fibre optic cables arranged parallel to the longitudinal direction of the inflow channel.

6. The apparatus according to claim 1, wherein the channel comprises a tapered section for restricting the diameter of the inflow channel.

* * * * *